United States Patent [19]

Ueda

[11] Patent Number: 4,517,431
[45] Date of Patent: May 14, 1985

[54] SAFETY DEVICE FOR A HEATING APPLIANCE

[75] Inventor: Shigeki Ueda, Yamatokoriyama, Japan

[73] Assignee: Matsushita Electric Industrial Co., Ltd., Osaka, Japan

[21] Appl. No.: 459,543

[22] PCT Filed: May 11, 1982

[86] PCT No.: PCT/JP82/00162
§ 371 Date: Jan. 5, 1983
§ 102(e) Date: Jan. 5, 1983

[87] PCT Pub. No.: WO82/04114
PCT Pub. Date: Nov. 25, 1982

[30] Foreign Application Priority Data

May 11, 1982 [JP] Japan .................. 56-71714
May 13, 1981 [JP] Japan .................. 56-71715
May 4, 1981 [JP] Japan .................. 56-86421

[51] Int. Cl.³ .............................. H05B 6/64
[52] U.S. Cl. ............... 219/10.55 B; 219/10.55 R; 340/309.15
[58] Field of Search .......... 219/10.55 B, 10.55 C, 219/492, 10.55 M, 506, 10.55 R; 340/309.15, 576, 527, 365 E; 323/299

[56] References Cited

U.S. PATENT DOCUMENTS

| 3,641,496 | 2/1972 | Slavin ................................. 340/148 |
| 4,011,428 | 3/1977 | Fosnough et al. ........... 219/10.55 B |
| 4,158,759 | 6/1979 | Mason ......................... 219/10.55 B |
| 4,163,120 | 7/1979 | Baumwolspiner ............... 179/1 SM |
| 4,242,554 | 12/1980 | Hurko et al. ................. 219/10.55 B |
| 4,351,999 | 9/1982 | Nagamoto et al. .......... 219/10.55 B |
| 4,396,817 | 8/1983 | Eck et al. ..................... 219/10.55 M |

FOREIGN PATENT DOCUMENTS

| 0000957 | 3/1979 | European Pat. Off. . |
| 80303608 | 10/1981 | European Pat. Off. . |
| 2900627 | 1/1980 | Fed. Rep. of Germany . |

Primary Examiner—Roy N. Envall, Jr.
Assistant Examiner—M. M. Lateef
Attorney, Agent, or Firm—Wenderoth, Lind & Ponack

[57] ABSTRACT

A safety means for heating appliances having a digital control section, such as electric ovens, microwave ovens, and composite ovens which combine the two preceding types, is arranged such that the completion of the setting of a timer or the like is determined by the passage of a given time period and the completion of the preparation for preheating is reported, while the sequence is advanced to make the start of heating possible. Furthermore, the placement of an object to be heated (11) in a heating chamber (11) is determined by detecting the opening and closing movement of a door, and a standby report is made to make the start of heating possible. In addition, in a heating appliance which requires preheating, the preheating completion time is estimated and reported so as to facilitate the preheating operation.

5 Claims, 8 Drawing Figures

SAFETY DEVICE FOR A HEATING APPLIANCE

BACKGROUND OF THE INVENTION

1. Field of the Invention

This invention relates to a safety means for such heating appliances having a digital control section as electric ovens, microwave ovens, and composite ovens which comprise the two preceding types, wherein the preheating completion time is estimated and reported, and the completion of preparation for cooking is detected by the opening and closing of the door, the time for pushing the start switch is reported, and the completion of preparation is reported upon ascertainment of the completion of a timer setting.

2. Description of the Prior Art

The recent development of semiconductor technology is remarkable, and the incorporation of electronic circuits in control systems is increasing rapidly. With the advent of stored logic type controllers represented by the microcomputer, digitalization of control systems is also increasing rapidly.

In the field of heating appliances also, the wave of such digitalization has changed the arrangement of control systems and the configuration of operating panels to a large extent. New functions which would be impossible to attain with conventional discrete circuits have been added one after another.

However, such digitalization of operating panels and adaptation of heating appliances for multifunction use can complicate the operation of the appliance, resulting in an increasing tendency for the user to experience troubles; user fails to fully utilize the "helpful"functions or erroneously operates the appliance, leading to unsatisfactory heating. Even a failure of part of the circuitry can cause the control system to run away, contrary to the user's intention.

Accordingly, there has been a desire for a heating appliance which will never start heating until the user has set desired data on heating, will report to the user the acceptance of the effective heating data by the control system to thereby make the operation readily understandable, and is capable of preventing the control system from running away even in the event of a failure.

As for an error often found particularly in the composite oven, the user forgets to do the idle heating, which is called preheating, (i.e., heating with no load put in the heating chamber) and consequently fails in cooking or by mistake the idle heating is performed for a cooking mode which forbids it. The number of such errors is increasing.

The manner of operating the heating appliance largely depends on differences in the type of heat source and in the method of heating food.

First, reference will be given to heating appliances equipped with an electric heater or gas burner as a heat source, such as an oven (hot oven) and grill. These heat sources heat food externally. Further, these heating methods can be roughly classified into two types by the heating mechanism, as follows.

One type is oven heating wherein food is baked in a heated atmosphere. This is a heating method wherein food is baked in a high temperature atmosphere with the radiant heat from the heat source being prevented from reaching the food. In this case, it is necessary to sufficiently elevate the temperature in the heating chamber prior to putting food therein. That is, idle heating called preheating must be done. Neglecting this would require a longer heating time or even cause a failure in cooking depending upon the kind of dish.

The other type is grill heating wherein food is baked by the radiant heat from the heat source. This type does not require preheating since heating is carried out by the infrared radiation from the heat source. If preheating is performed by mistake, the interior of the heating chamber will reach a considerably high temperature in a short time , entailing danger. The user will be given a rough estimate of the required heating time for grill heating under conditions not including unnecessary preheating; thus, preheating would result in scorching.

While the foregoing refers to the difference based on the presence or absence of preheating, there is another great difference in operation between oven heating and grill heating. It lies in restart after the door is opened in the course of heating. Generally, the heat source used for oven heating is a sheathed heater which emits less radiation, so that the heater itself takes some time in raising the temperature in the heating chamber. Thus, it is often so arranged that once heating is started, electric supply to the sheathed heater is continued even if the door is opened in between. Of course, temperature control is performed. In such a case, therefore, oven heating is restarted simply by the user closing the door again.

On the other hand, a quartz tube heater and special sheathed heater are used for the grill heating and emit infrared radiation at high rates. These heaters exhibit a satisfactory rise in infrared radiation. There is no need to maintain the interior of the heating chamber at a high temperature. Thus, if the door is opened during heating, the electric supply to the heater will be cut off to protect the user against a burn. Thus, it is usually arranged so that the start key must be pressed again for a restart.

Reference will now be given to such heating appliances as a microwave oven, equipped with a microwave generator, e.g., a magnetron. Microwave heating heats an object internally and externally at the same time and needs no preheating. If, therefore, preheating (i.e., idle heating) is effected by mistake, though there is no danger of scorching as in grill heating this can be very dangerous since it results in an increased leakage of microwaves from the main body and in overheating local portions of the heating chamber (where the standing waves are strong). Further, it damages the magnetron, shortening its life. In other words, idle heating in the microwave oven is strictly prohibited.

For prevention of idle heating, the microwave oven must be so arranged that the start key must be pressed before heating can be restarted, each time the door is closed.

As described above, the manner of operation widely differs according to differences in heat source and heating method. Moreover, composite heating appliances in which these oven, grill and microwave heating methods are integrated are coming to have a share of the greater part of the demand. Thus, the user should accurately remember and carry out the disparate operations for the respective heating methods. A mistake in these operations entails not only a failure in cooking but also possible dangers of hurting the person and even causing a fire.

Thus, preheating has been a difficult thing, particularly with respect to the composite oven, as described above. Moreover, preheating has the following problems left unsolved.

How to carry out preheating—there are three methods, roughly classified. A first method is to set a necessary preheating temperature and wait until heating to this temperature. This is the intrinsic form of preheating, superior in the functional aspect of elevating the temperature in the heating chamber to a predetermined value, and is capable of completing preheating in a shorter time than any of the other methods which follow, though it dose not allow the user to leave the heating appliance since how long preheating will take is unknown.

A second method is to set a heating time alone and continue supplying electricity to the heater or the like serving as the heating means until a predetermined period of time has elapsed. The time at which preheating ends is obvious, so that this method is the most simple and convenient method for the user. However, since the preheating temperature is directly influenced by the heating chamber temperature and the source voltage at the start of preheating, different preheating temperatures will result; thus, this method is inferior in a functional aspect.

A third method, which is a combination of the preceding two methods, is to set both a preheating temperature and a preheating time. According to this method, after the preheating temperature is reached, temperature control is performed until the present time has elapsed; thus, this method is superior both in a functional aspect and in a operating aspect in that the preheating completion time is made known. As compared with the first method, however, it requires extra time and energy. The operating procedure is also increased, imposing an increased burden on the user.

SUMMARY OF THE INVENTION

With the above in mind, the present invention has for its object the provision of a heating appliance which will never start heating until the user has set desired data on heating, will report to the user the acceptance of the effective heating data by the control system by using a synthesized voice or other means to thereby make the operation readily understandable, and is capable of preventing the control system from running away even in the event of a failure.

Furthermore, the invention realizes the provision of a heating appliance which notifies the user of the presence or absence of an object to be heated and of the time for operating the start switch and which detects the opening and closing of the door to indirectly infer the presence or absence of an object put therein so as to advance the heating sequence by one step, thus ensuring a safe operation.

The invention also provides a system adapted to complete heating with a minimum of time end energy involved and to estimate and report the preheating completion time.

BEST MODE OF CARRYING OUT THE INVENTION

Figure 1:
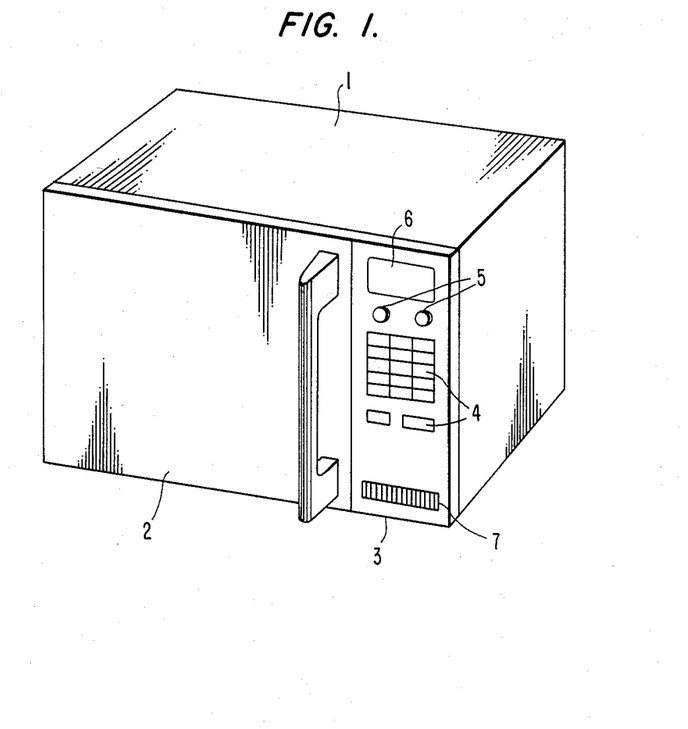
FIG. 1 is a prespective view of a main body, showing an emboidment of the invention.

FIG. 1 is a perspective view of the main body of a heating appliance, showing an embodiment of the invention. The main body 1 has a door 2 pivotally mounted on the front surface thereof, said body being provided with an operating panel 3. Arranged on the operating panel 3 are a keyboard 4 and numerical-value setting knobs 5 serving as input means enabling the user to give various instructions to the control system. The numeral 6 denotes an indicator window for indicating heating data which is set through said input means, and 7 denotes a vocal port for delivering synthesized voices.

Figure 2:
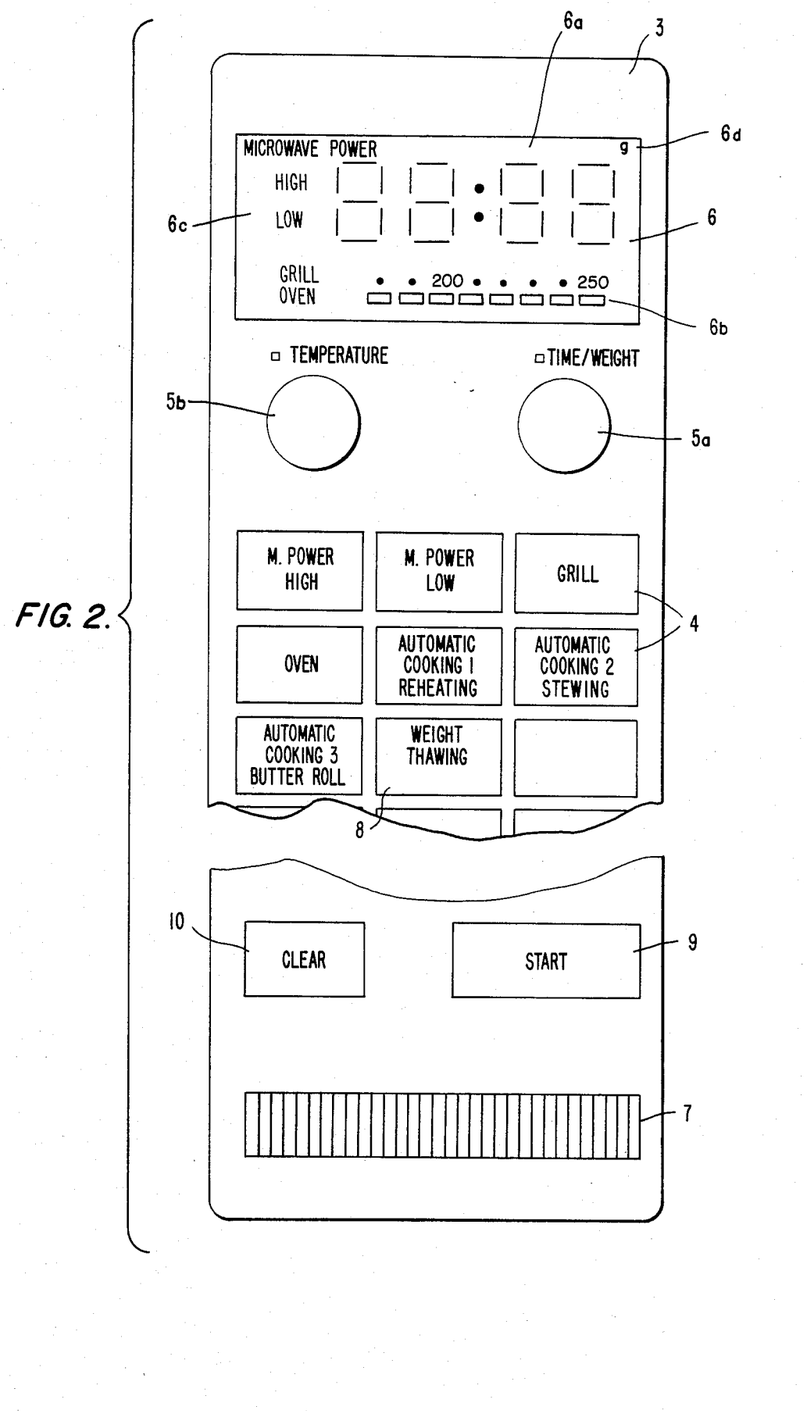
FIG. 2 is a detailed view of the principal portion of said main body.

FIG. 2 is a detailed view of the principal portion. Arranged on the keyboard 4 are various function keys for giving instructions on heating modes to the control system. The numerical-value setting knobs comprise a time knob 5a for inputting "time/weight" and a temperature knob 5b for inputting "temperature". The time knob 5a is capable of inputting a heating time for each mode and the weight of an object to be heated for a "weight thawing" mode, while the temperature knob 5b is capable of inputting chamber temperatures for grill and oven modes.

Arranged in the indicator window 6 are a numeral indicating section 6a for indicating a heating time or weight, temperature bars 6b for indicating temperatures, and a mode status 6c for indicating heating modes.

A weight thawing key 8 is used to cause the control system to calculate the heating time by inputting the weight of an object to be heated; thus, it clears the user of the burden of conversion to the heating time. At this time, in the indicator window 6 a "g" status 6b is lighted to indicate the inputted weight.

A start key 9 is used to give an instruction to start heating and a clear key 10 is used to stop heating or cancel a program.

Figure 3:
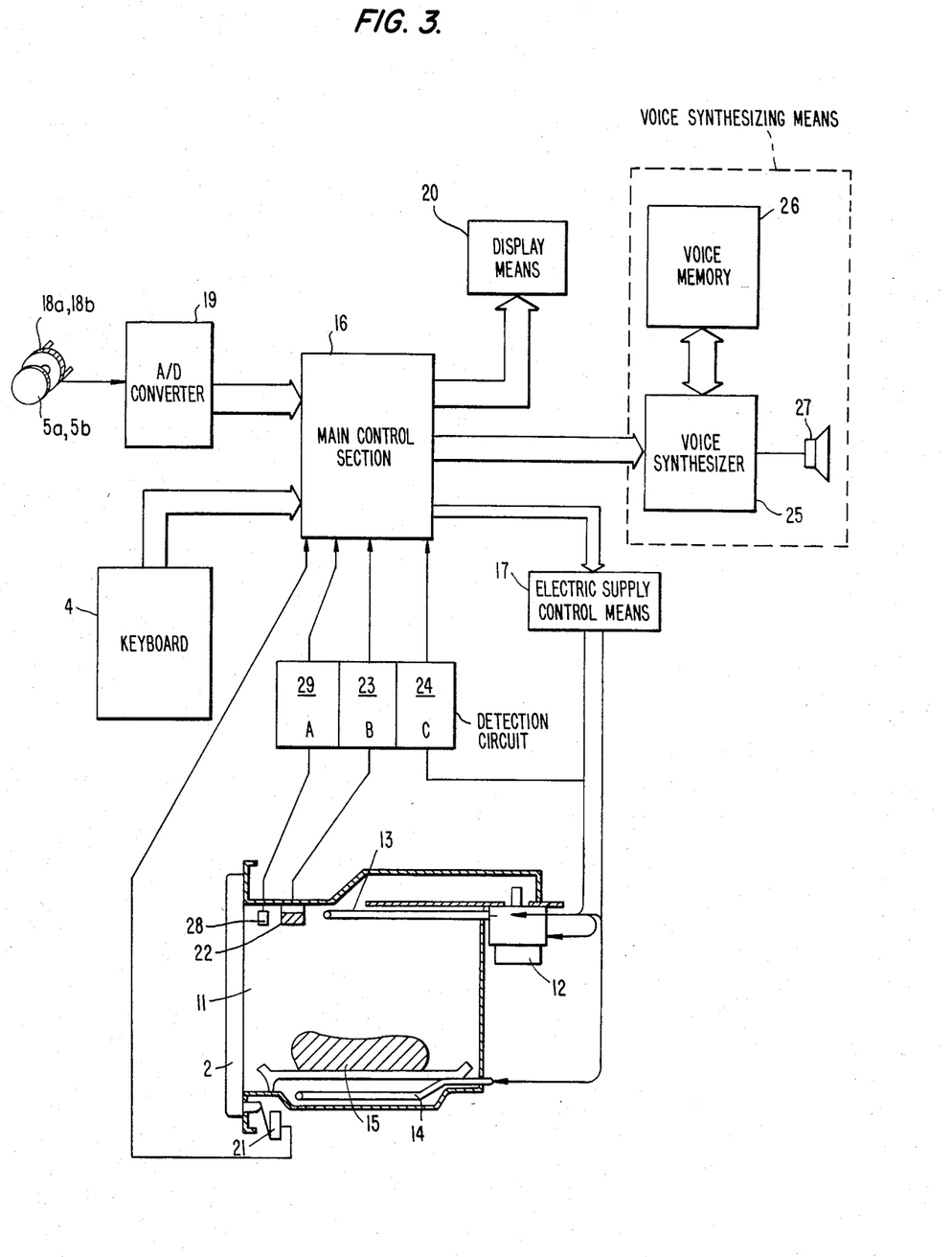
FIG. 3 is a system block diagram of the same.

FIG. 3 is a block diagram showing the system arrangement of the heating appliance. Installed in a heating chamber 11 are a magnetron 12 and heaters 13 and 14, which are heating means, to supply thermal energy to an object to be heated 15. Electric supply to these heating means is controlled by a main control section 16. The numeral 17 denotes an electric supply control section including switching means, such as a relay, and a driver for driving it.

Data on heating is inputted into the main control section 16 from the keyboard 4 and also from potentiometers 18a, 18b connected to the knobs 5a, 5b. The numeral 19 denotes an A/D converter for reading in the resistance values of the volumes. Such potentiometers may be constructed as rotary encoders. The data on heating inputted by such input means is stored in a RAM in the main control section 16. Heating is controlled on the basis of data on heating. Further, such data on heating is displayed by display means 20.

The opening and closing movement of the door 2 is detected by a door switch 21 serving as door opening and closing detecting means and is inputted into the main control section 16.

The numeral 22 denotes a thermistor serving as sensor means for detecting the temperature in the heating chamber 11. The numeral 23 denotes a detection circuit B for reading variations in the resistance value of the thermistor and inputting them into the microcomputer, said detection circuit being constructed, e.g., of an A/D converter.

The numeral 24 denotes a detection circuit C for monitoring the source voltage. It may be constructed, e.g., of an A/D converter or it may be a comparison circuit for comparison with a reference voltage, formed of a simpler device, e.g., a zener diode.

A voice synthesizing means comprises a synthesizer 25, a voice memory 26, and a speaker 27.

The voice memory 26 has voice data stored therein to allow the synthesizer 25 to read out said voice data so as to synthesize voice signals. These voice signals are transferred to the speaker 27 and converted into voices.

The numeral 28 denotes a sensor for detecting the progress of heating, and 29 denotes a detection circuit therefor. The sensor 28 may be in the form of a thermistor for detecting the temperature in the heating chamber 11, a humidity sensor for detecting vapor being evolved from the object 15, or an infrared sensor for detecting infrared rays being emitted from the object 15.

Figure 4:
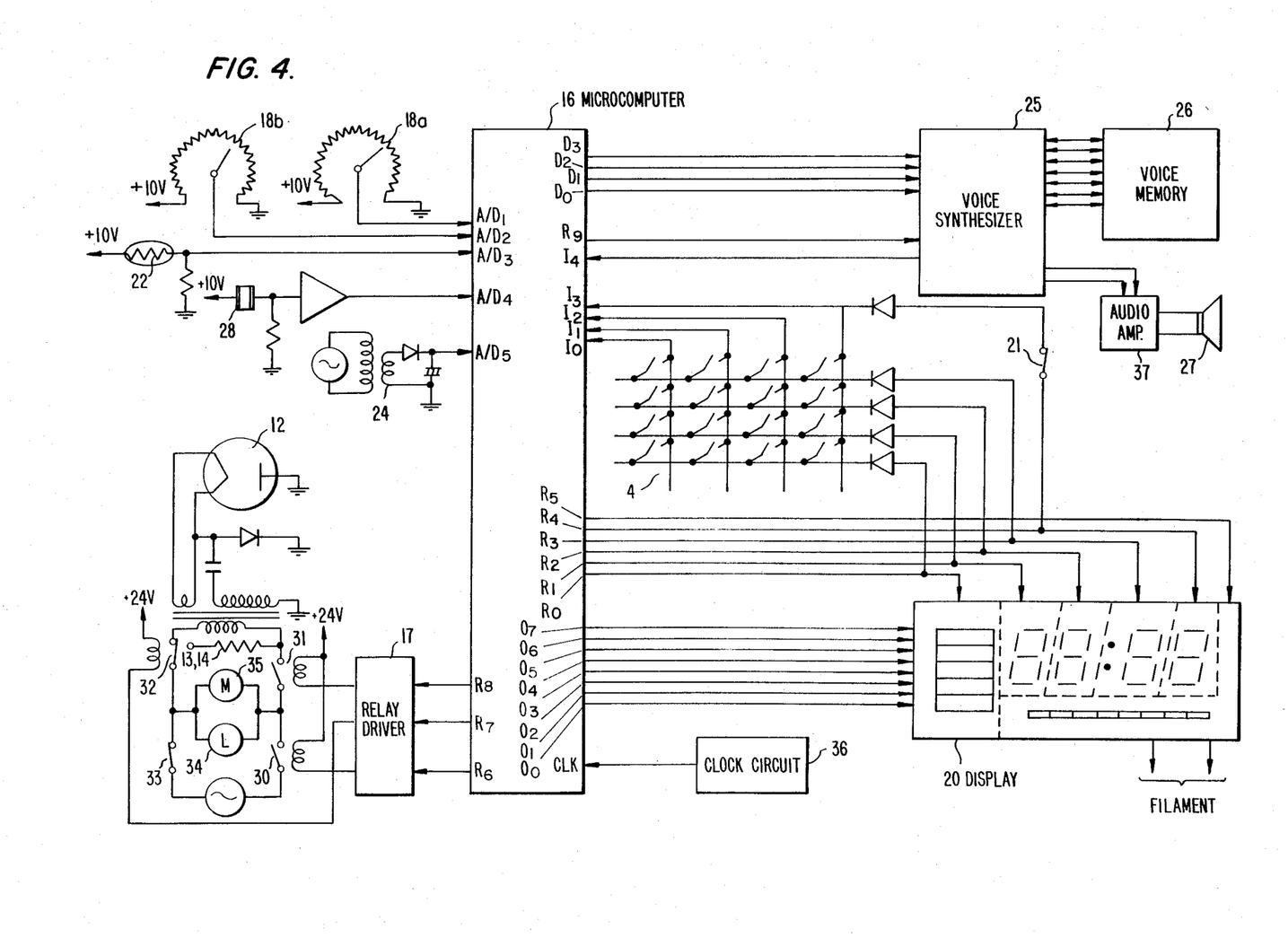
FIG. 4 is a circuit diagram, showing a concrete example of said block diagram.

FIG. 4 is a circuit diagram showing an embodiment of said system. The main control section 16 is constituted of a controller of the stored program type, e.g., a one-chip microcomputer. Such a microcomputer 16 controls the electricity supplied to the magnetron 12 or to the heaters 13, 14, through a relay driver representing the electric supply control section 17. A time relay 30 is a relay adapted to be continuously closed during this electricity supply. A power relay 31 is a relay adapted to be intermittently closed during this electricity supply and acts to change the average output from the magnetron 12 or heaters 13, 14. The numeral 32 denotes a switching relay for controlling switching between the magnetron 12 and the heaters 13, 14.

In addition, 33 denotes a main circuit door switch for breaking and making the main circuit in response to the opening and closing of the door; 34 denotes an interior lamp; and 35 denotes a motor for a cooling fan or the like.

Data on heating are inputted into the microcomputer 16 from a keyboard 4 and from the potentiometers 18$a$, 18$b$. A/D$_1$ and A/D$_2$ denote A/D input terminals, containing A/D converters. The keyboard 4 has a key matrix built thereon, swept by outputs R$_0$–R$_3$ and connected to input terminals I$_3$–I$_0$.

The door switch 21 is swept by an output R$_4$ and connected to the input terminal I$_3$.

The sweep outputs from the key matrix also serve as grid control signals for the fluorescent display tube 20 capable of dynamic lighting. The display tube 20 comprises 6 grids and obtains display data from outputs O$_0$–O$_7$.

The arrangement of various sensor means will now be described. The numeral 22 denotes a thermistor for detecting the temperature in the heating chamber. It is connected to the A/D input terminal A/D$_3$. The numeral 28 denotes a humidity sensor which detects the progress of heating. It is connected to A/D$_4$. The numeral 24 denotes a source voltage monitor which detects the voltage in the main circuit. It is connected to A/D$_5$.

Also inputted into the microcomputer 16 is a clock signal which forms a basis for timer counting. The numeral 36 denotes a clock circuit therefor.

The voice synthesizing means comprises the voice synthesizer 25, voice memory 26, and speaker 27. For this synthesizer, for example, an LSI unit based on a PARCOR synthesizing method is employed. The numeral 37 denotes an audio amplifier which drives the speaker 27. The readout address is outputted from the microcomputer 16 through D$_0$–D$_3$. The microcomputer 16 controls the synthesizer by means of an R$_9$ output signal and an I$_4$ input signal.

In such an arrangement, the procedure for inputting data on heating and the method of control associated therewith will now be described.

Figure 5:
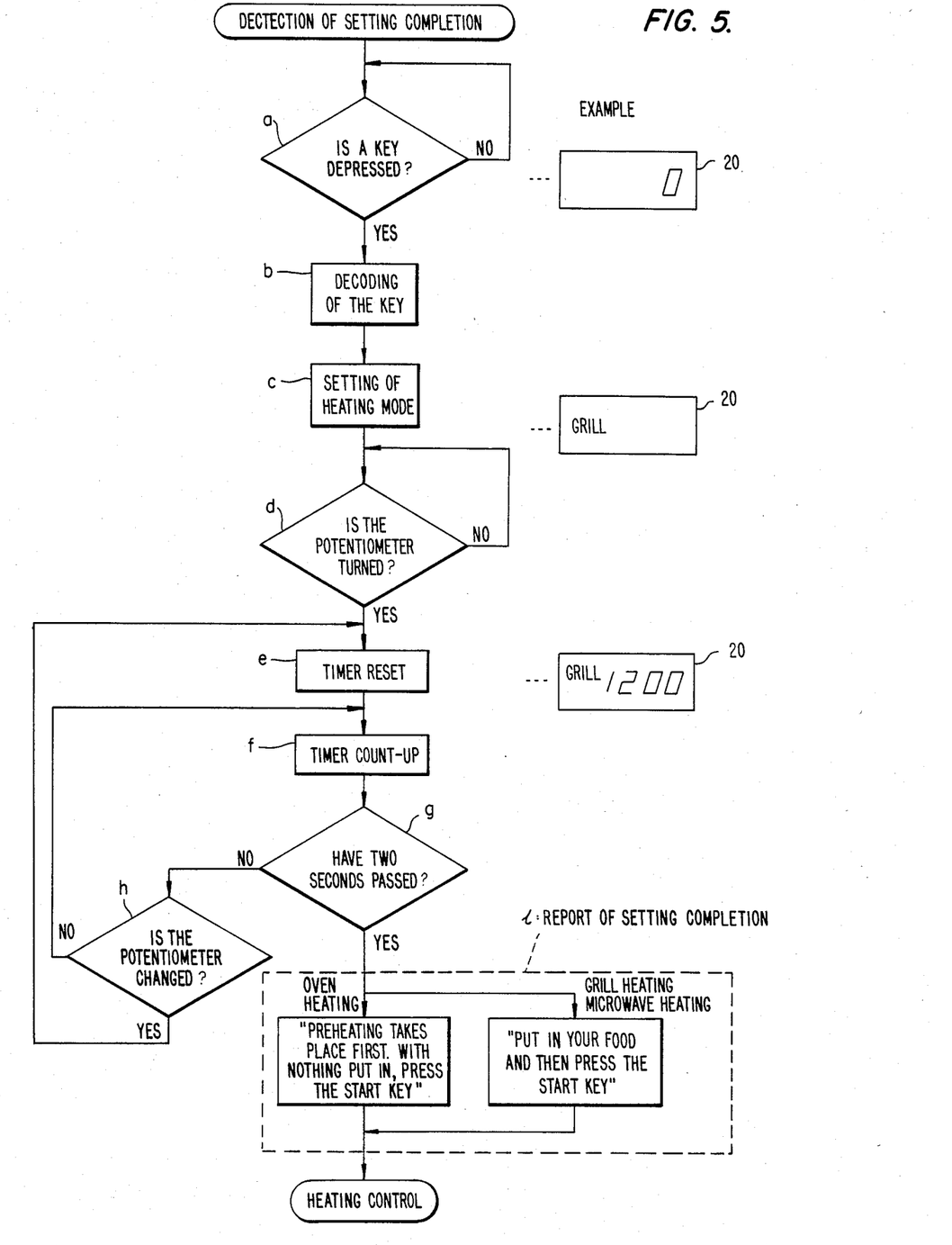
FIG. 5 is a flowchart showing a program arrangement for detection of completion of setting.

FIG. 5 is a flowchart illustrating such a procedure and control. First, the microcomputer 16 waits for a key 4 to be pressed, while displaying "0", (a).

When a key 4 is pressed, the microcomputer decodes it (b), and sets the corresponding heating mode (c). Thus, the set heating mode is displayed on the display tube 20, with "0" disappearing and with the digit places being all blank.

In this condition, the microcomputer 16 waits for the potentiometer 18 (18$a$, 18$b$) to be turned (d). As soon as the potentiometer 18 is turned, the microcomputer resets the interior timer (e) and starts counting up (f). At this time, a heating time which has been set appears in the display tube 20.

When the interior timer counts a predetermined time (2 seconds, in this example), this results in time-up (g). If the volume is turned again during this time (h), the microcomputer determines that the setting of the heating time has not been completed, and it resets the timer again and counts 2 seconds afresh. That is the sequence will not proceed until the end of fine adjustment of heating time made by the potentiometer 18, followed by a lapse of 2 seconds.

Upon the lapse of 2 seconds, the microcomputer 16 outputs a predetermined voice selection signal to the synthesizer 25 and reports the completion of setting through the speaker 27 (i). For example, in the case of grill heating and microwave heating, it reports in a synthesized voice, "Put in your food and then press the cooking start key." In the case of oven heating, it voices a warning: "Preheating takes place first. With nothing put in, press the start key." Thereafter, the microcomputer 16 waits for the start key to be pressed.

The provision of such sequence ensures that operation will not be started by mistake even if the start key is pressed when a heating time and temperature are not set or are being set or even if noise causes a misunderstanding. Furthermore, even if the start key is damaged and remains ON or even if the potentiometer brush and resistance pattern get out of order, the normal sequence is protected from being executed, thus preventing the start of heating. The former results in the on-state of the start key being detected before the volume is turned, so that such is neglected. The latter results in the potentiometer value fluctuating rather than being stabilized, so that the timer cannot count 2 seconds. Thus, the invention is not seriously influenced by actual parts failures.

In addition, the setting completion report may be made by a display tube, still providing the same effect. However, the synthesized voice provides a higher warning effect and is more concrete.

Furthermore, it is also possible to make a report concerning the sensor 28 by using the voice synthesizing section. For example, in the case of such a humidity sensor as a Humiceram, as the temperature in the heating chamber 11 rises, the humidity sensor exhibits thermistor characteristics, failing to detect humidity changes. Thus, a thermistor and a humidity sensor may be provided as the sensor means and a program may be so prepared that if the temperature in the heating chamber rises above a certain level, a report is made to the effect that automatic cooking is impossible.

An arrangement for advancing the heating sequence depending upon the opening and closing movement of the door will now be described with reference to FIG. 6.

After setting data on heating, the user opens the door, puts an object to be heated in the heating chamber, and closes the door again. Thus, the microcomputer can indirectly detect the placement of an object in the heating chamber, from the opening and closing movement of the door (j). Then, it advances the heating sequence by one step, and waits for the start key to be pressed. At the same time, it makes a report urging the user to do that, ("Press the start key"). In the case of oven heating, such operation on the door is normally not performed, but if it is performed, there is a possibility that an object to be heated has been placed by mistake. Thus, the microcomputer urges the user to do the idle heating again, ("With nothing put in, press the start key").

With an object to be heated placed or removed, as requested, the start key is then pressed (k). Thereupon, the microcomputer starts the electricity supply to the individual heating means and reports that heating is going to be started, ("Cooking begins"). In the case of oven heating, an estimated preheating time report Z is made, ("Preheating will be over in about X minutes"). (This will be later described in more detail.)

In addition, if the start key is pressed without passing through the state j, i.e., without the opening and closing of the door, the microcomputer determines that idle heating has been performed, and it will not start the electricity supply to the heating means except for oven heating. Thus, the danger of performing idle heating is eliminated. In addition, the order of performing key operation and object placement may be reversed. In this case, nothing will be reported since preparation for preheating is not completed at the time of placement.

Suppose that the door is opened during heating (1). Then, in the case of grill heating and oven heating, the step j is followed, ("Press the start key"); in the case of oven heating, the user is requested to continue idle heating, ("Don't put in food until completion of preheating"). In this case, since it is undesirable to lower the heater temperature, electric supply to the heater is not stopped. Therefore, once the door is closed, preheating is continued, so that operation on the start key is not required nor is a report made urging the user to do that.

After restart, time-up or the heating temperature is reached (m), whereupon a report of the completion of heating is made, ("It's finished"). In the case of oven heating, the completion of preheating and a request for placement of an object are announced, ("Preheating is over. Put in your food and then press the start key").

Subsequent placement of an object to be heated (n), operation on the start key, and report of time-up or of attainment of heating temperature (o) are the same as in grill and microwave heating.

While synthesized voices have been used as reporting means in this embodiment, other reporting means, such as display tubes and LEDs are applicable, of course.

Figure 6:
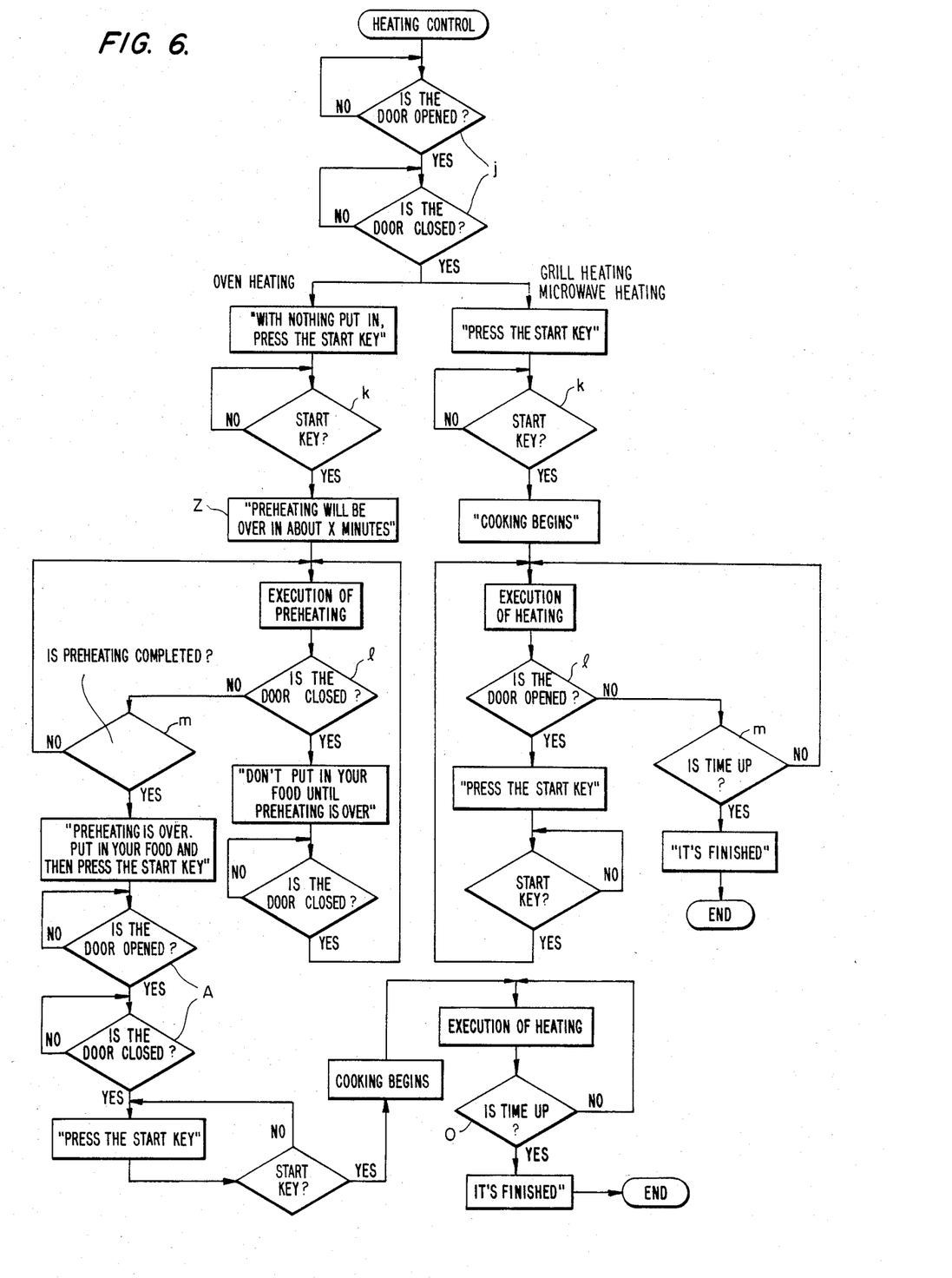
FIG. 6 is a flowchart showing a program arrangement for control of heating.

In FIG. 6, it will be recalled that an estimated preheating time report Z was executed; that is, it was a report saying, "Preheating will be over in about X minutes." This is performed by the thermistor 22 detecting the temperature in the heating chamber before or immediately after the start key is pressed and by the monitor 25 measuring the source voltage.

On the basis of such measurements, the microcomputer 16 outputs the temperature of preheating to be effected first into the display section or the fluorescent display tube 20, estimates the time required for the preheating, and reports said time in synthesized voice through the voice synthesizing section comprising the synthesizer 25, voice memory 26 and speaker 27.

Figure 7:
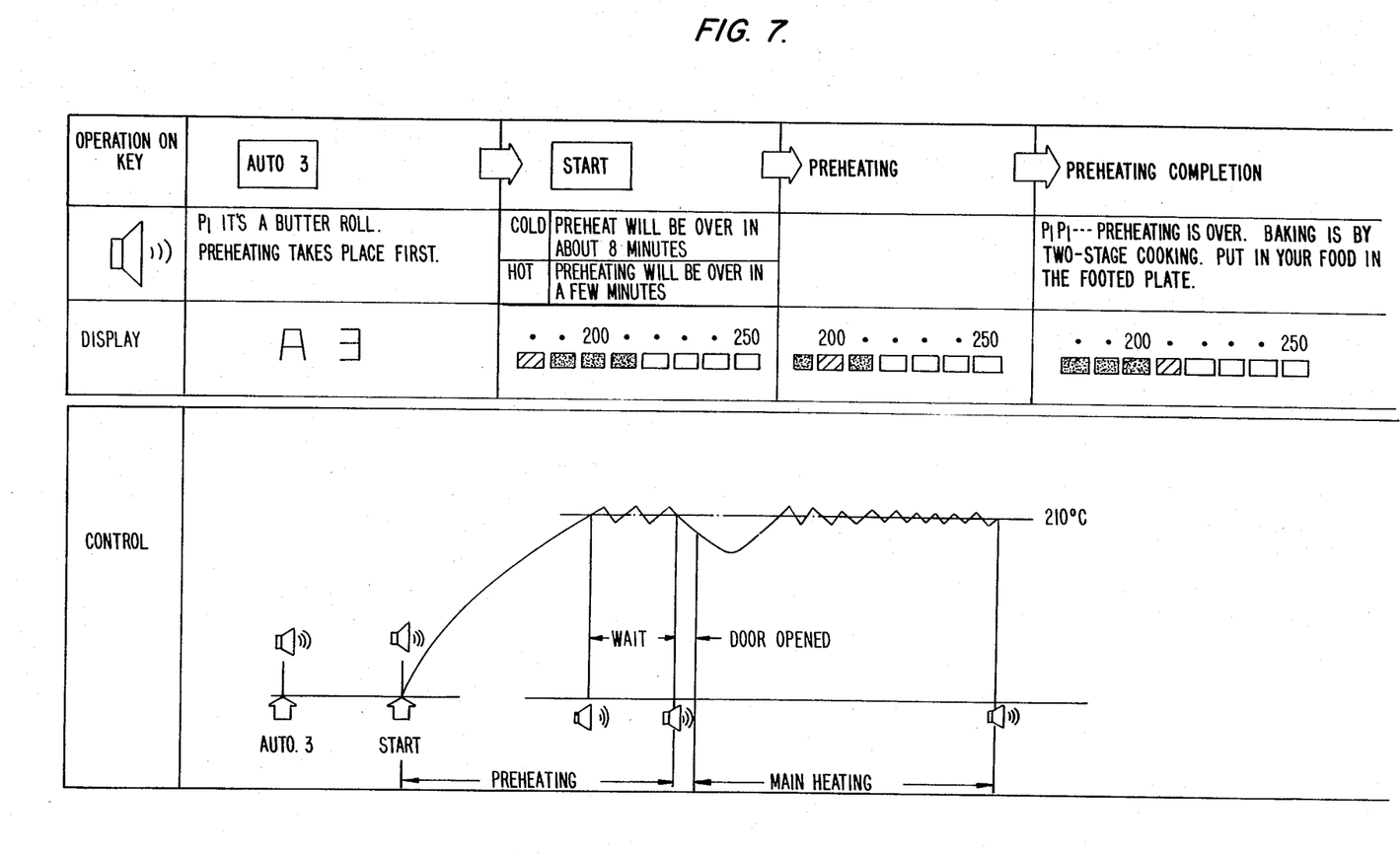
FIG. 7 shows a concrete example of preheating control.

While monitoring the source voltage is indispensable for strict estimation of preheating time, the following expedient may be contemplated. FIG. 7 shows a concrete embodiment oriented to automatic oven heating. Suppose that a key for automatic cooking 3 is pressed. Then, the microcomputer produces a buzzer sound (pi) and then reports the name of the menu corresponding to the heating pattern, ("It's a butter roll"). Furthermore, the display tube 20 outputs display data "A3" to indicate that automatic cooking 3 has been effectively accepted. The synthesizer 25 subsequently reports that the preheating sequence has been preset, ("Preheating takes place first").

When the start key is pressed, the microcomputer 16, as already described, calculates or estimates the time taken to reach the preheating temperature, from the temperature in the heating chamber, and reports it in synthesized voice, ("Preheating will be over in about 8 minutes"). The estimated time is also displayed by the numeral display section 6a. In the example shown in FIG. 7, whether the temperature in the heating chamber is above 100° C. or not is taken into account in connection with processing, the former case being referred to as hot start and the latter as cold start. In the case of hot start, a standard period of time (8 minutes) taken to reach the preheating temperature (180° C.) for butter rolls is reported, while with cold start a shorter period of time is reported,("in a few minutes" or "in 2 to 3 minutes"). As for temperature indication, the preheating completion temperature is indicated by lighting and the present time by blinking.

Upon completion of preheating, several times periods of buzzing are followed by a report of the completion of preheating. ("Preheating is over"). Continuing the temperature control, the microcomputer waits for the user to come (wait cycle). Knowing an approximate time of preheating completion, the user will come back to the heating appliance before that time. That is, without requiring constant attendance on the part of the user, such wait time can be made very short. Thus, the merit of the first conventional method ( a minimum of preheating time and energy) and the merit of the second (knowable preheating completion time) can be combined, and the wasteful wait time and troublesome operation involved in the third method are no longer required.

After the wait cycle, when the user opens the door, the microcomputer 16 makes a report about the cooking procedure for main heating and about the attachments which must be (or can be) used, ("Baking is by two-stage cooking. Put your food in the footed plate").

Whereas in a heating appliance of the microwave and hot oven combination type the differential use of various attachments has been inevitable (e.g., metal plates for hot oven and glass plates for microwave oven), the invention enables these plates to be readily used each in its proper way.

Thus, the combined use of synthesized voices and temperature sensors in the manner described above has made it possible to execute the heretofore troublesome preheating sequence in a simple operation free from errors.

Figure 8:
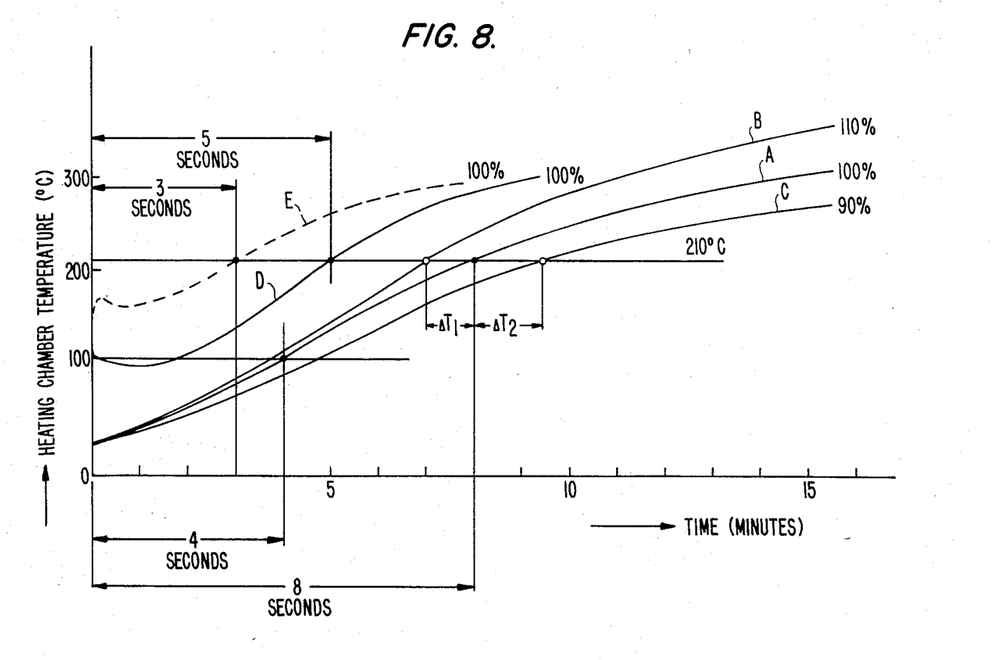
FIG. 8 is a diagram showing temperature rise characteristics in a heating chamber.

A method of more strictly estimating preheating time by using the source voltage monitor 24 will now be described. FIG. 8 is a graph showing heating chamber temperature rise characteristics. Curve A represents a standard pattern starting at room temperature, showing that it takes 8 minutes for the temperature to reach 210° C. If the source voltage changes, the temperature gradient also changes. Curves B and C represent characteristics at 110% voltage and 90% voltage, respectively. In the case of curves B and C, the standard time $T_s$ must be corrected by an amount of $\Delta T_1$ (1 minute) and $\Delta T_2$ (1–2 minutes), respectively, and the corrected times will be reported.

A manner of starting with the heating chamber already heated to a certain extent will now be described. Curves D and E predominate in this case. Curve D represents a situation where the heating chamber has considerably cooled, i.e., some amount of time has passed since the last heating. The temperature in the region around the sensor is still high, so that when stirring begins, the temperature in the heating chamber becomes uniform, causing the temperature around the sensor to drop temporarily. In such case, therefore, though the sensor has already reached 100° C. it does not follow that it is correct to subtract 4 minutes from the standard pattern A. Actually, it takes 5 minutes.

The other curve E is found in a situation where heating is interrupted on the way. That is, while the heater chamber is sufficiently high in temperature, the temperature in the region around the sensor has not risen. An example of this case is where the door is opened during preheating and preheating is restarted. In this case, the preheating completion time is shorter than 4 minutes, being reduced to about 3 minutes.

Thus, if the temperature in the heating chamber and the source voltage at the start of heating can be measured and if the tendency of temperature rise immediately after the start of heating can be detected, the preheating time can be estimated with substantial accuracy. Accordingly, temperature display can be provided by the display section and a rough estimate of the preheating time can be provided by the voice synthesizer and display tube. While synthesized voices have been used as reporting means in the present embodiment, other reporting means such as display tubes and LEDs may be used in place of synthesized voices.

It is a matter of course that the voltage to be measured in the source voltage monitor 24 can be used as DC power source for the control system. Since any trouble such as momentary power failure can be detected as soon it occurs by virtue of said measurement, the microcomputer 16 can be forced to reset itself when it is in normal operation, to thereby prevent the microcomputer from running away.

As has been described so far, according to the present invention, in a heating appliance having a digital control section, there is no possibility of heating being started by mistake before data on heating is set. Effective heating data is accepted and the next operation is reported in synthesized voice, etc., the operation is easy to understand. In the event of a failure, the normal sequence is prevented from proceeding, so that there is no possibility of heating being started.

By detecting the opening and closing movement of the door, placement of an object to be heated in the heating chamber is indirectly ascertained, the time for such placement being reported to make it sure. On the basis of these features, safety means can be realized.

Additionally, in a heating appliance which requires preheating, the procedure for preheating, including estimation of the time of completion of preheating, is simple and easy and can be efficiency carried out.

I claim:

1. A heating appliance comprising: a heating chamber for receiving an object to be heated therein; a heating means connected to said heating chamber; a main control section for controlling electric power which is supplied to said heating means; a memory connected to said control section for storing data on heating; an input means connected to said memory for inputting said data to said memory; a timer means and a reporting means connected to said control section; wherein when data on heating is inputted or corrected by said input means, said timer is started, and if no data is inputted during the elapsing of a predetermined time period as determined by said timer, then said main control section determines that the setting or correcting of data on heating has been completed, and causes said reporting means to report that it is possible to start heating, wherein a voice synthesizing means comprises said reporting means.

2. A heating appliance as set forth in claim 1, wherein when said main control section determines that the setting of data on heating has been completed, said voice synthesizing means orally reports that operation of a heating start instruction means connected to said control section is requested.

3. A heating appliance comprising: a heating chamber for receiving an object to be heated therein; a heating means connected to said heating chamber; a main control section for controlling electric power which is supplied to said heating means; a memory connected to said control section for storing data on heating; an input means connected to said memory for inputting said data to said memory; a timer means and reporting means connected to said control section; wherein when data on heating is inputted or corrected by said input means, said timer is started, and if no data is inputted during the elapsing of a predetermined time period as determined by said timer, then said main control section determines that the setting or correcting of data on heating has been completed, and causes said reporting means to report that it is possible to start heating; and wherein said input means comprises either a potentiometer having a rotatable knob or a rotary encoder.

4. A heating appliance comprising: a heating chamber for receiving an object to be heated therein; a heating means connected to said heating chamber; a main control section for controlling electric power which is supplied to said heating means; a memory connected to said control section for storing data on heating; an input means connected to said memory for inputting said data to said memory; a timer means and a reporting means connected to said control section; wherein, when data on heating is inputted or corrected by said input means, said timer is started, and if no data is inputted during the elapsing of a predetermined time period as determined by said timer, then said main control section determines that the setting or correcting of data on heating has been completed, and causes said reporting means to report that it is possible to start heating; and wherein data on the weight of said object to be heated is inputted to said control section by said input means and said main control section calculates the heating time from said data.

5. A heating appliance as set forth in claim 4, further comprising a display means for displaying said weight when data on heating is set, and for displaying said heating time calculated by said main control section when it is determined that either the setting has been completed or when heating is started.

* * * * *